(12) United States Patent
Hilaire et al.

(10) Patent No.: US 12,327,451 B2
(45) Date of Patent: Jun. 10, 2025

(54) SYSTEM TO ENHANCE SECURITY OF ACCESS AND ELECTRONIC KEY AND COMBINATION DISTRIBUTION

(71) Applicant: VaultRight, LLC, Dallas, TX (US)

(72) Inventors: Eric Hilaire, Tulsa, OK (US); Adam Cobb, Dallas, TX (US)

(73) Assignee: VAULTRIGHT, LLC, Dallas, TX (US)

( * ) Notice: Subject to any disclaimer, the term of this patent is extended or adjusted under 35 U.S.C. 154(b) by 147 days.

(21) Appl. No.: 18/231,109

(22) Filed: Aug. 7, 2023

(65) Prior Publication Data
US 2024/0054833 A1    Feb. 15, 2024

Related U.S. Application Data

(60) Provisional application No. 63/396,435, filed on Aug. 9, 2022.

(51) Int. Cl.
G07C 9/00 (2020.01)

(52) U.S. Cl.
CPC ..... *G07C 9/00912* (2013.01); *G07C 9/00857* (2013.01); *G07C 2009/00865* (2013.01)

(58) Field of Classification Search
None
See application file for complete search history.

(56) References Cited

U.S. PATENT DOCUMENTS

| | | | |
|---|---|---|---|
| 4,766,746 A | 8/1988 | Henderson | |
| 5,321,242 A * | 6/1994 | Heath, Jr. | G07F 9/06 235/382 |
| 8,593,252 B2 | 11/2013 | Fisher | |
| 9,164,419 B2 | 10/2015 | Uneme | |
| 9,805,210 B2 | 10/2017 | Nord | |
| 9,978,193 B2 | 5/2018 | Briskey | |
| 10,108,811 B1 | 10/2018 | Walker | |
| 10,169,937 B1 | 1/2019 | Zwink | |
| 10,304,266 B1 | 5/2019 | Gilbertson | |
| 10,880,298 B2 | 12/2020 | Chabanne | |
| 11,170,594 B1 | 11/2021 | Burge | |
| 11,232,513 B2 | 1/2022 | Minsley | |
| 11,270,541 B2 | 3/2022 | Mehrotra | |
| 11,328,248 B2 | 5/2022 | Brow | |
| 2004/0025039 A1 | 2/2004 | Kuenzi | |
| 2020/0302719 A1 | 9/2020 | Einberg | |
| 2020/0399929 A1 | 12/2020 | Hardter | |
| 2021/0279985 A1 | 9/2021 | Igein | |
| 2022/0101423 A1 | 3/2022 | Minsley | |

* cited by examiner

*Primary Examiner* — K. Wong
(74) *Attorney, Agent, or Firm* — Hemingway & Hansen, LLP; D. Scott Hemingway; Elizabeth P. Hartman (57) ABSTRACT

The present invention is a system that enhances security at an institution by supporting increased security associated with the access and distribution of physical and electronic keys and combinations. The present invention is an advanced security control system that uses unique user credentials, QR code matching, and indisputable day/date stamps to validate events, and logs all event details in a verified format. The system provides enhanced security for access to secure areas with verified logging of event details. The system also provide for secure tracking of keys, combination inventory and issuance, along with verified tracking, issuing, and storage of electronic keys, codes, and combinations.

20 Claims, 8 Drawing Sheets

SYSTEM TO ENHANCE SECURITY OF ACCESS AND ELECTRONIC KEY AND COMBINATION DISTRIBUTION

CROSS REFERENCE TO RELATED APPLICATIONS

This application claims the benefit of U.S. Provisional Application No. 63/396,435 filed Aug. 9, 2022, which is incorporated by reference into this utility patent application.

STATEMENT REGARDING FEDERALLY SPONSORED RESEARCH OR DEVELOPMENT

Not applicable.

TECHNICAL FIELD OF INVENTION

This invention relates to the field of communication systems supporting security access with one or more mobile units.

BACKGROUND OF THE INVENTION

Institutions, such as banks and banking locations, restrict access to sensitive areas at the bank or banking location. The sensitive areas at a banking facility may include areas were money, financial papers, sensitive information, or other valuable items are securely maintained. Authorized personnel may be granted physical keys or combination information so they may gain access to appropriate sensitive areas at the banking location. Oftentimes, the authorized personnel must authenticate their identity or their authorized status before being granted keys or combinations, or alternatively, prior to being allowed to access the sensitive area.

There are established authentication systems used at institutions to permit access to secure areas and/or provide keys or combinations to selected personnel. These authentication systems have traditionally relied on logs or listings the document actions taken by one or multiple employees. The use of logs or listings is inefficient and time consuming, and time and date entries on logs or listings may possess errors in name, time, and date entries, whether intentional or unintentional. Such logs or listings can also be manipulated by employees trying to conceal nefarious actions, such as theft. Traditional logs or listings are maintained at the banking location, and reconciliation of these logs and listings with actual activities or back-up resources can be a time-consuming and labor-intensive activity.

With respect to the issuance of physical keys and combinations to authorized personnel, the system used in the past require that accurate key books having physical keys be maintained, which can be a difficult proposition. Keys can be listed by employee, but it requires maintaining two logs simultaneously, one by key and one by employee. However, this opens the door for even more errors. Additionally, some keys are not listed by employee name, which makes it difficult to track past key and combination history. Combinations provided to personnel are also not securely maintained, and this information can easily be exposed. Moreover, combination envelopes are often used at banking locations, but envelope retrieval can be inefficient and prone to failure.

With respect to the issuance of combinations to authorized personnel, the prior systems have used a physical lockbox, which required two employees to each ender codes or each use a separate key to open so that a third person could be issued a combination. In certain systems, the lockbox would contain sealed envelopes that possessed a combination. Once the lock-box is opened, the two employees would remove an envelope containing the combination that would be provided to the third person. The third person, a receiving employee, would view and record the combination, and then that third person would place the combination information back into a new sealed envelope. During this process, the risk of improper disclosure of the combinations is significant. Moreover, this traditional system of providing a combination to an authorized person can be cumbersome, as well as insecure.

Accordingly, there is a need to replace logs and listings to eliminate losses, lost productivity, mistakes, and errors, as well as possible embezzlement. There is also a need to eliminate insecure systems of authentication associated with issuance of physical keys and combinations to authorized personnel. Moreover, there is a need to allow for a more expedited reconciliation process associated with activities conducted at the bank and banking location.

SUMMARY OF THE INVENTION

The present invention is a system for recording details of employee access to secure vaults and/or lockboxes and to record the issuance of physical and/or electronic keys, combinations, or codes used to access secure vaults and/or lockboxes used during operations at banks and other institution locations, such as branch bank and credit union locations.

The security and documentation aspects involved with the present invention could be used at various types of premises or businesses where there is a need for secure access by physical and/or electronic key/codes/combination, as well an accounting and other verified/secure documentation of the time-stamped, verified and secured "who, what, when" information relating to the provision and/or access of keys, codes or combinations. By electronic key/codes/combinations, the invention can also include providing codes and keys for accessing restricted areas or unlocking a connected smart/IoT lock.

The present invention is an advanced security control system that enhances security by: (1) restricting access to keys and combination information, (2) tracking key inventory and issuance, and (3) storing, tracking and issuing combinations. The present invention uses unique user credentials to validate and log secure access events, and provides for tracking, validating, and recording of access granted to secure areas and distribution of secure access instruments. The present invention supports the use of unique user credentials, code matching (QR matching), and indisputable day/date/time stamps. When security or secure access transactions are logged by the present invention, there is a verified record of the event details, which provides an easily accessible chronology or listing of record events.

The secure access system of the present invention disclosed herein tracks details pertaining to issuance of keys, combinations, and codes to employees with all of the event details logged in the system and stored in a secure database. For these recorded events, some details are automatically captured and logged, such as date, time and any information selected as an option presented on-screen, such as an employee or log name. Some details are logged in the system upon user input of data, such as signatures, identification credentials, and additional notes specific to the transaction, such as a customer name or a cash amount. The system for digital event logging for secure area access and distribution of keys and combinations as disclosed herein provides a trackable and validated solution to the numerous problems associated with the previously logs or listings.

The present invention is a communication system supporting security access communications with one or more mobile units. The system has a home network associated with a first facility location and having a home agent coupled to a computer server, the home agent and the computer server processing communications received from the one or more mobile units. The computer server and the home agent are coupled to a database memory that maintains log records for the communication system, and the home agent and the computer server are coupled to a transceiver unit and the Internet for receiving and transmitting communications with the one or more mobile units.

The disclosed system has a first processing unit associated with the computer server on the home network, the first processing unit being coupled to the home agent and the first processing unit analyzing communications received from the one or more mobile units. The first processing unit, in response to a communication request received from the one or more mobile units, transmits a security code to one or more mobile units, the security code being generated by the first processing unit using a cryptographic code generation subroutine and the security code being stored on the log record maintained on the database memory; the log record maintained on the database memory records the date/time and location of use of the security code being stored. The first processing unit stores in the database memory, in response to one or more personnel being granted access to one of more secure areas at the first facility location, a record of the personnel being granted access, the secure area being granted access, and the date/time access was granted.

In the disclosed system, the home network opens physical access to one or more secure areas at the first facility location based on a communication received from one or more mobile units, the communication validating the entry of an acceptable verification code into the one or more mobile units. The first processor unit stores a record in response to physical access being opened to one or more secure areas. The record includes an identification the personnel that opened physical access to the one or more secure areas, a listing of any item removed from the one or more secure areas; the identification of any person that was provided with any item removed from the one or more secure areas; and the date/time and location when the personnel opened physical access to one or more secure areas. The home network, in response to detecting that physical access has been opened to one or more secure areas at the first facility location, transmits a communication to one or more predetermined personnel to inform those predetermined personnel that access was provided to one or more secure areas.

In the system of the present invention, the first processing unit is programmed with business rules and parameters, and the first processing unit, in response to detecting a violation of one or more of the business rules and parameters, transmits a communication to one or more predetermined personnel to inform those predetermined personnel of the violation of the one or more business rules and parameters. The first processing unit stores in the database memory, in response to one or more personnel being removed access to one of more secure areas at the first facility location, a record of the personnel being removed access, the secure area being denied access, and the date/time access was removed.

In the disclosed communication system, the security code transmitted by the first processing unit includes a combination associated with one or more secured areas. The security code transmitted by the first processing unit includes a combination associated with one or more secured areas. The one or more secure areas includes a key-box, vault, or lock boxes. The code transmitted to the mobile unit includes a security key, a cabinet/drawer key, or a front door key. The acceptable verification code entered into the one or more mobile units includes a dual verification code. The item removed from one or more secure areas includes a security key, electronic combination or code. The item removed from one or more secure areas includes a cabinet/drawer key or a front door key. In the disclosed system, one or more secure areas are locked using a smart/IoT lock. The system further has an RFID tag that is used to detect if physical access to one or more secure areas is already opened.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE INVENTION

The present invention is an advanced security control system that enhances security by: (1) restricting access to keys and combination information, (2) tracking key inventory and issuance, and (3) storing, tracking and issuing combinations. The present system will enhance security of the access and electronic key distribution to others compared to known systems, and the present system will:

(1) provide digital cataloging and documenting of "audit trails" including the verified and secure storage of entered data including date and time stamps when daily audits, periodic audits, or other periodic activities are conducted by appropriate personnel, with documentation and storage of such verified time and date stamps of the completion of the periodic activity so that inaccurate time and date information cannot be input regarding when the activity is conducted;

(2) document and digitally catalog the identification of personnel that access secure areas such as key-boxes, vaults, and lock boxes with identification of people accessing particular vaults or lockboxes (vaults, key-box, or lockbox), what was provided or given/removed (security key, cabinet/drawer key, front door key) to whom (person A, B or C); and the date/time and location when a secure vault was accessed and the contents provided to that person (security key, electronic combination or code);

(3) document and/or provide access to secure lockboxes and vaults based on codes and electronic combinations, with cryptographic generation and storage of individual codes and combinations on mobile devices used by appropriate personnel;

(4) support electronic entry and storage of dual access or dual verification codes or combinations into a remotely accessed system prior to allowing access or entry into a secure lockbox or vault;

(5) provide notifications to selected personnel to inform those selected personnel about (a) when access is provided to vault and/or secure lock-boxes, (b) what and when codes, keys and combinations are provided to other personnel; (c) when audits or other periodic activities are conducted at a particular location; and/or (d) when branch or other locations are opened, cleared, and closed without event or incidents;

(6) support mechanical activities and actions, such as opening/locking vault and lockbox doors, based on the entry of appropriate keys, codes and/or combinations required by the system;

(7) provide alerts and notifications to selected personnel if: (a) a possible fraud circumstance arises or is detected by the system, with the group of selected personnel depending on the location of the fraud situation and type of possible fraudulent activity (e.g. alert would be automated, the invention is preprogramed with business rules/parameters and will automatically send alerts if user activity falls outside of these parameters), and/or (b) an event or incident arises or might be happening, such as robbery, intruder or other threat, at a location (e.g. alert would be an emergency notification send manually by an employee to make all other employees aware of something going on in real time, and this emergency notification feature and once the alert is written and a user hits send (they select to one employee, employee's by location, or to All) the notification is then sent via text, email, and push notification));

(8) provide detailed, searchable, filterable, reports of documented events (key/combo issuance, vault/premises access, etc.) to help users look for variations and/or patterns for fraud investigations, audits, or other research; and, (9) provides an option to unlock/allow access to secure vaults and/or lockboxes while simultaneously documenting the access details ("who, what, when") with time stamps and identity verification (this may work in conjunction with a smart/IoT lock installed on a vault). The system also may use RFID tag to detect if a Vault Door was opened so the system may or may not need to make a corresponding log entry).

The present invention uses unique user credentials to validate and log secure access events, and provides for tracking, validating, and recording of access granted to secure areas and distribution of secure access instruments. The present invention supports the use of unique user credentials, code matching (e.g. QR matching), and indisputable day/date stamps. When security or secure access transactions are logged by the present invention, there is a verified record of the event details, which provides an easily accessible chronology or listing of record events.

The secure access system of the present invention disclosed herein tracks details pertaining to issuance of keys, combinations, and codes to employees with all of the event details logged in the system and stored in a secure database. For these recorded events, some details are automatically captured and logged, such as date, time and any information selected as an option presented on-screen, such as an employee or log name.

Some details are logged in the system upon user input of data, such as signatures, identification credentials, and additional notes specific to the transaction, such as a customer name or a cash amount. The system for digital event logging for secure area access and distribution of keys and combinations as disclosed herein provides a trackable and validated solution to the numerous problems associated with the system logs or listings.

The disclosed invention is a communication system supporting security access communications with one or more mobile units. The system has a home network associated with a first facility location and having a home agent coupled to a computer server, the home agent and the computer server processing communications received from the one or more mobile units. The computer server and the home agent are coupled to a database memory that maintains log records for the communication system, and the home agent and the computer server are coupled to a transceiver unit and the Internet for receiving and transmitting communications with the one or more mobile units.

The disclosed system has a first processing unit associated with the computer server on the home network, the first processing unit being coupled to the home agent and the first processing unit analyzing communications received from the one or more mobile units. The first processing unit, in response to a communication request received from the one or more mobile units, transmits a security code to one or more mobile units, the security code being generated by the first processing unit using a cryptographic code generation subroutine and the security code being stored on the log record maintained on the database memory. The log record maintained on the database memory records the date/time and location of use of the security code being stored. The first processing unit stores in the database memory, in response to one or more personnel being granted access to one of more secure areas at the first facility location, a record of the personnel being granted access, the secure area being granted access, and the date/time access was granted.

The home network opens physical access to one or more secure areas at the first facility location based on a communication received from one or more mobile units, the communication validating the entry of an acceptable verification code into the one or more mobile units. The first processor unit stores a record in response to physical access being opened to one or more secure areas. The record includes an identification of the personnel that opened physical access to the one or more secure areas, a listing of any item removed from the one or more secure areas; the identification of any person that was provided with any item removed item from the one or more secure areas; and the date/time and location when the personnel opened physical access to one or more secure areas. The home network, in response to detecting that physical access has been opened to one or more secure areas at the first facility location, transmits a communication to one or more predetermined personnel to inform those predetermined personnel that access was provided to one or more secure areas.

In the present invention, the first processing unit is programmed with business rules and parameters, and the first processing unit, in response to detecting a violation of one or more of the business rules and parameters, transmits a communication to one or more predetermined personnel to inform those predetermined personnel of the violation of the one or more business rules and parameters. The first processing unit stores in the database memory, in response to one or more personnel being removed access to one of more secure areas at the first facility location, a record of the personnel being removed access, the secure area being denied access, and the date/time access was removed.

In the disclosed communication system, the security code transmitted by the first processing unit includes a combination associated with one or more secured areas. The security code transmitted by the first processing unit includes a combination associated with one or more secured areas. The one or more secure areas includes a key-box, vault, or lock boxes. The code transmitted to the mobile unit includes a security key, a cabinet/drawer key, or a front door key. The acceptable verification code entered into the one or more mobile units includes a dual verification code. The item removed from one or more secure areas includes a security key, electronic combination or code. The item removed from one or more secure areas includes a cabinet/drawer key or a front door key. In the disclosed system, one or more secure areas are locked using a smart/IoT lock. The system further has an RFID tag that is used to detect if physical access to one or more secure areas is already opened.

Figure 1:
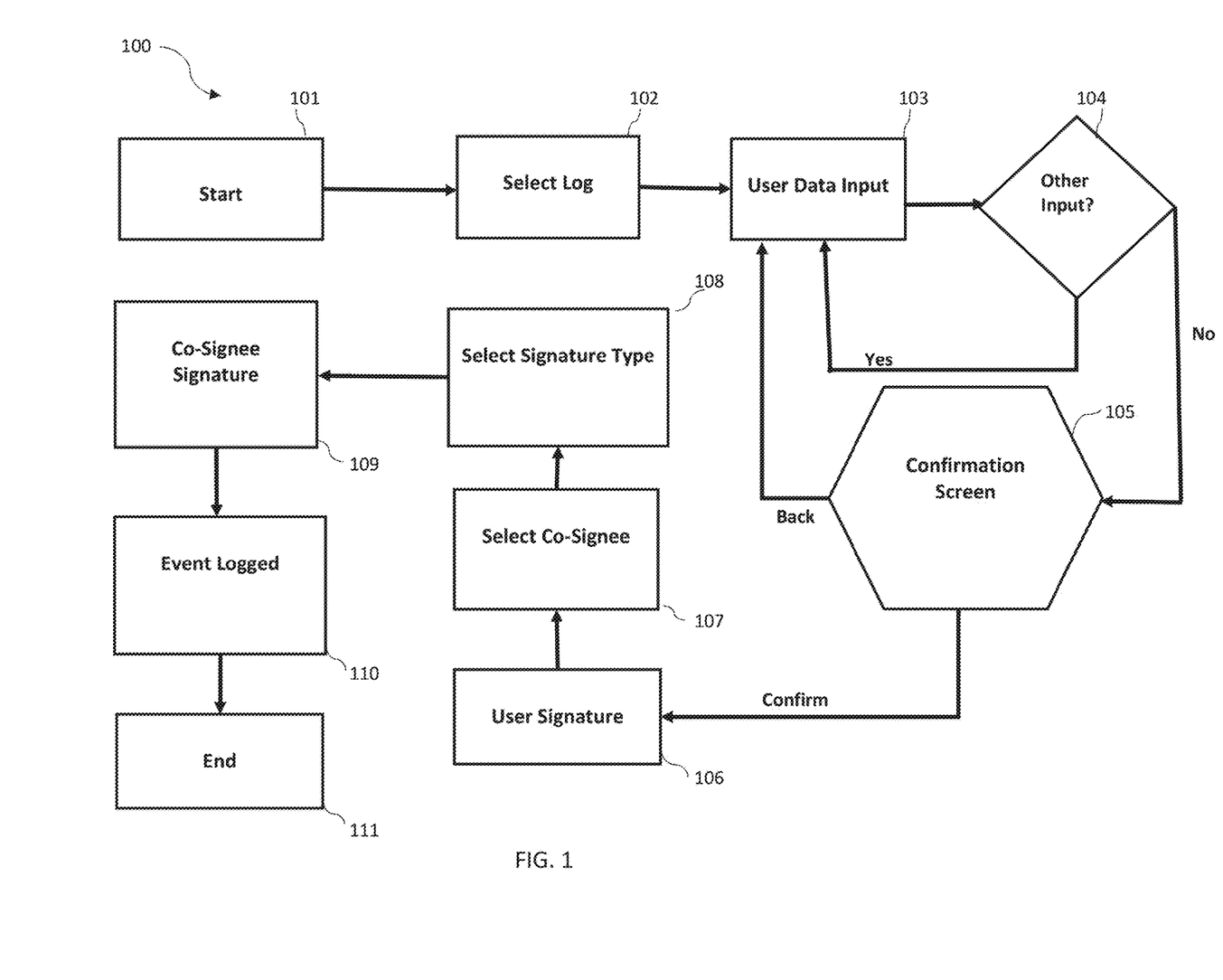
FIG. 1 is a Digital Log Event Flow Chart for granting secure access.

The present invention also verifies the initial "two-employee" (dual control) access with documentation and time-stamping of when a vault door and/or lock-box is opened to gain access to physical and/or electronic keys, codes or combinations. FIG. 1 is a flow chart diagram 100 showing secure digital logging of an event according to the disclosed system using dual person authentication. At start 101, the user logs into the secure access digital log system of the present invention on a mobile application or website. The user then selects a secure log 102 to open from a list of options. In step 103, the selected log is opened and the user inputs data for the log event, and in step 104 the user is asked if there is additional data to input for the log event.

If the answer is yes, the user is returned to the data input step 103 to input the additional data. If the answer is no, the user proceeds to confirmation step 105 where the user reviews the automatically generated data, such as date, time and user's name, and the data input by the user for accuracy. If the user indicates the data shown is not accurate, the user is returned to the data input step 103 for correction of the entry. If the user confirms the data shown is accurate, the user proceeds in step 106 to a user signature page to submit a signature and request confirmation.

In step 107, the user selects a co-signee from a list of authorized names and then proceeds to step 108 to select the how the co-signee will sign. Options for signatures may include a co-signee entering a Personal Identification Number (PIN) on the user's mobile device, scanning a QR code on another device, or inputting a written signature on a device. In step 109, the co-signee will sign in the designated manner. After the co-signee has signed, the system proceeds in step 110 to log all event details in the database and in step 111, the secure log event is ended.

FIGS. 2A-2E shows screens that a user encounters for a secure digital log event. These figures show screens on a mobile device, and if the program is accessed via a webpage on a computer, the user will encounter similar screens requiring the same data input to authenticate transactions. To request secure access, a requesting user will open the secure access digital log system of the present invention on a mobile device and sign in using the requesting user's name or email and a password to access the secure log function. A Single Sign-on may also be used in some instances from the login screen. For dual person authentication, digital log events require input by the requesting user and input by a co-signee in order to grant access to secure areas such as a vault, or to issue keys, codes or combinations, to a receiving employee or user.

Figure 2A:
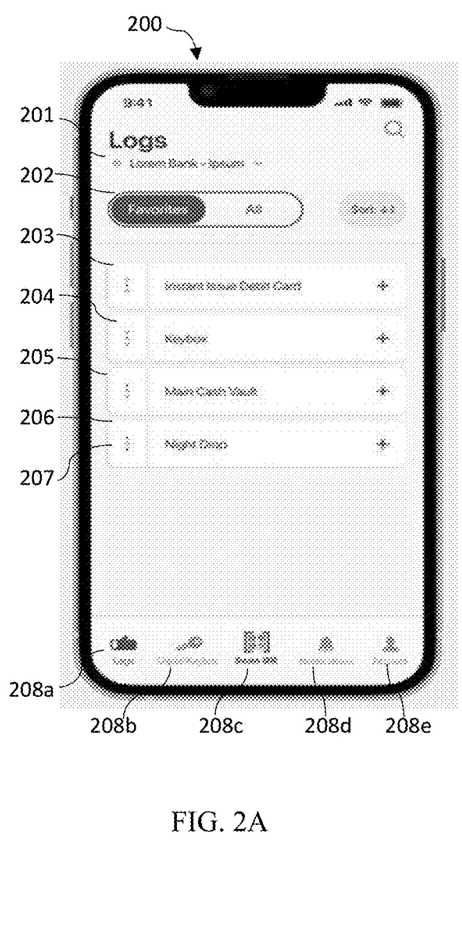
FIGS. 2A-2E are a series of screen shots showing Digital Log Events.

In FIG. 2A, mobile log screen 200 identifies the log is for the specified facility 201 and has a toggle switch 202 between favorites and all to locate log events. Log event types are selected onscreen, and in this embodiment are identified as Instant Issue Debit Card 203, Keybox 204, Main Cash Vault 206 and Night Drop 206. The three vertical dots 207 to the left of the log name allow users to quickly view recent history for that log. The log events indicated here are representative only and types of log events may be added or deleted depending on the types of transactions that are required for an institution. At the bottom of the screen are quick access links for features of the present invention, including logs 208a, digital keybox 208b, scan QR 208c, notifications 208d and account 208e, which allow a user to easily navigate between the functions.

Figure 2B:
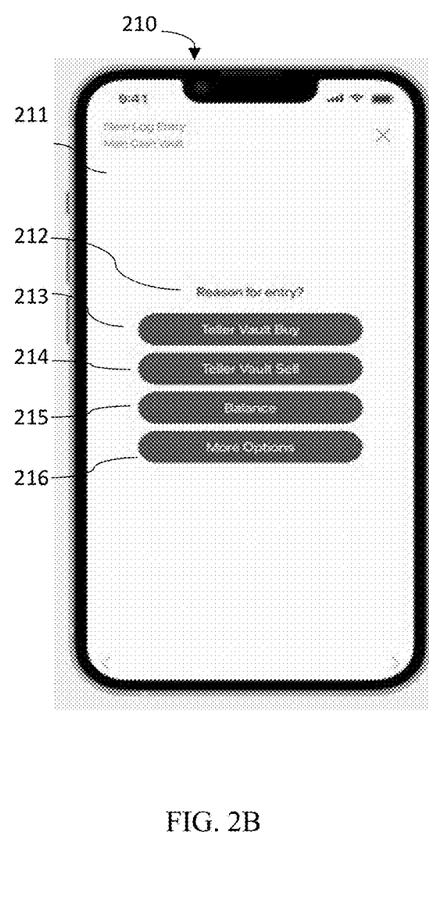

As seen in FIG. 2B, an employee or user inputs request data into a series of one or more data input screens that have been preconfigured by their institution. The new log entry screen 210 identifies the type of log event as pertaining to the Main Cash Vault 211. Users are asked the reason for entry 212 into the vault, and the user selects a reason from the list presented on the screen. Reasons on this screen are the most used reasons and here indicate a Teller Vault Buy 213, a Teller Vault Sell 214, or a Balance check 215. There is also a more options button 216 with additional reasons that may be selected. If a user selects Teller Vault Buy 213, the user would be directed to a data entry screen to input the amount of the buy and the user can also input additional notes related to the buy. Screens and entry fields can be easily edited, added, or removed using the administration panel of the present invention.

Figure 2C:
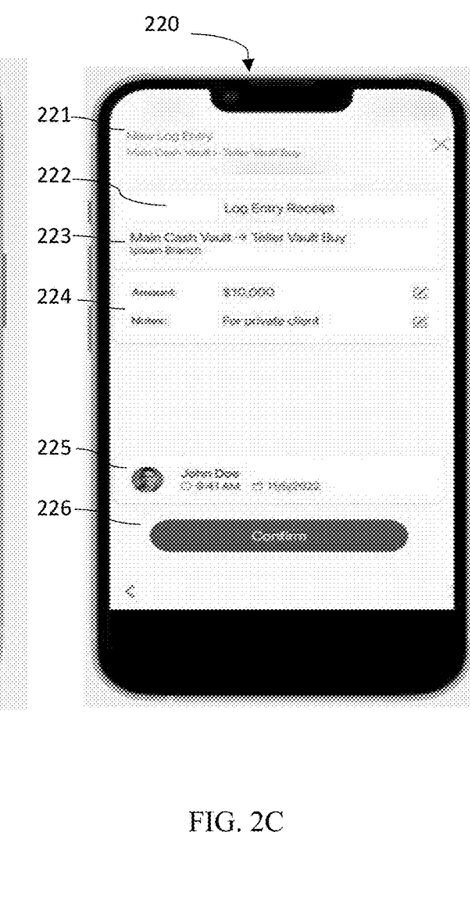

FIG. 2C shows that once the details of the buy are entered, a new log entry Teller Vault Buy screen 220 provides details of the buy in a log Entry Receipt 222 which identifies the log event and the facility 221 at the screen top. Details of the Teller Vault Buy 224 show the cash amount and note that the buy was for a private customer. User details 225 show the user's name along with the date and time of the event. If the log event details are correct, the user taps the confirm button 226 to proceed.

Figure 2D:
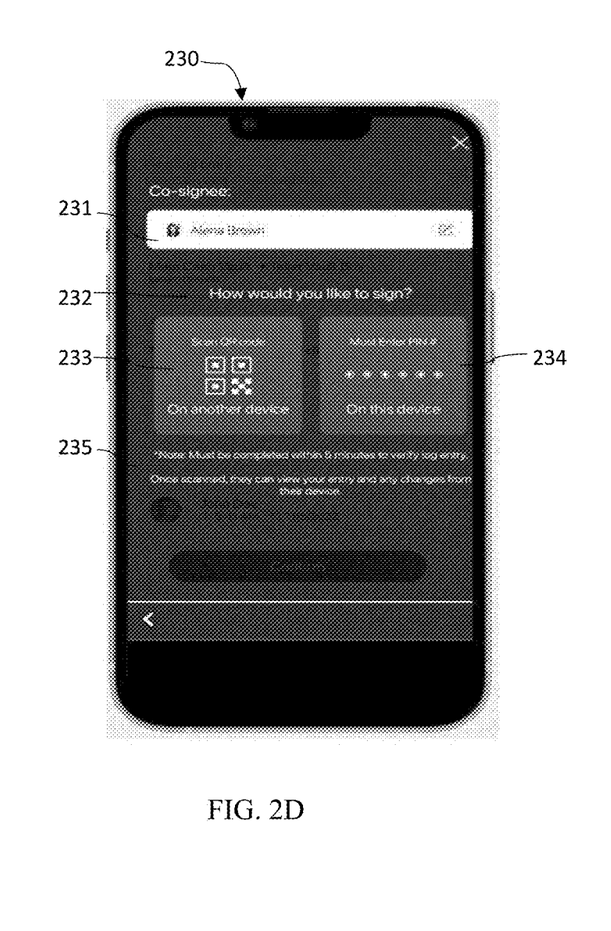

If the user's signature is required, the user will be directed to a signature input screen. If the secure log event requires a co-signee, the user is directed to a list of authorized co-signees to select a co-signee for the log event. In FIG. 2D, after a co-signee has been selected, the co-signee screen 230 pops-up and the identified co-signee 231 will be asked to choose a how to sign 232. Here, the co-signee can choose between scanning a QR code 233 on another device or entering a PIN 234 on this device. An on-screen message 235 informs the co-signee that the signing must be completed within 5 minutes to verify the log entry, and that once the QR code is scanned, the entry can be viewed.

The Scan QR code 233 option requires the co-signee to log into the secure access application of the present invention on a separate device which helps to prove that the user and the co-signee were together for the transaction. If the co-signee chooses the PIN option 234 to sign, the co-signee enters their PIN on the requesting user's device. If the co-signee's written signature is required for an additional dual control, the co-signee will be directed to a signature input screen that identifies the signatory, and records and submits the signature. The signature confirmation is logged in the log event details.

Figure 2E:
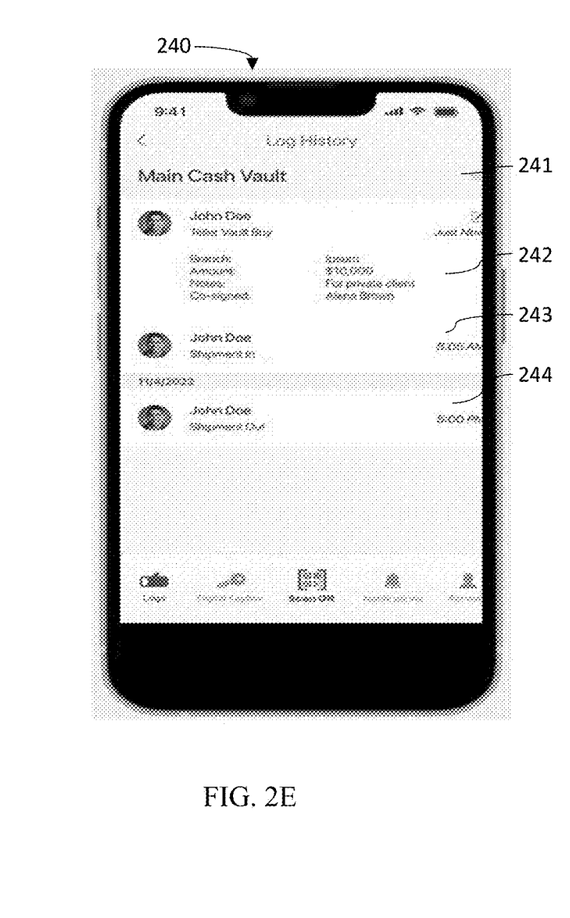

As shown in FIG. 2E, log history screen 240 shows the transactions that have occurred. In this example, log entries shown in the history are for the Main Cash Vault 241. The history on this screen 240 shows a Teller Vault Buy 242 and a Shipment In 243 for the current day and also shows a Shipment Out 244 on a previous day. The date, time and user for each transaction are recorded for each logged event.

Figure 3:
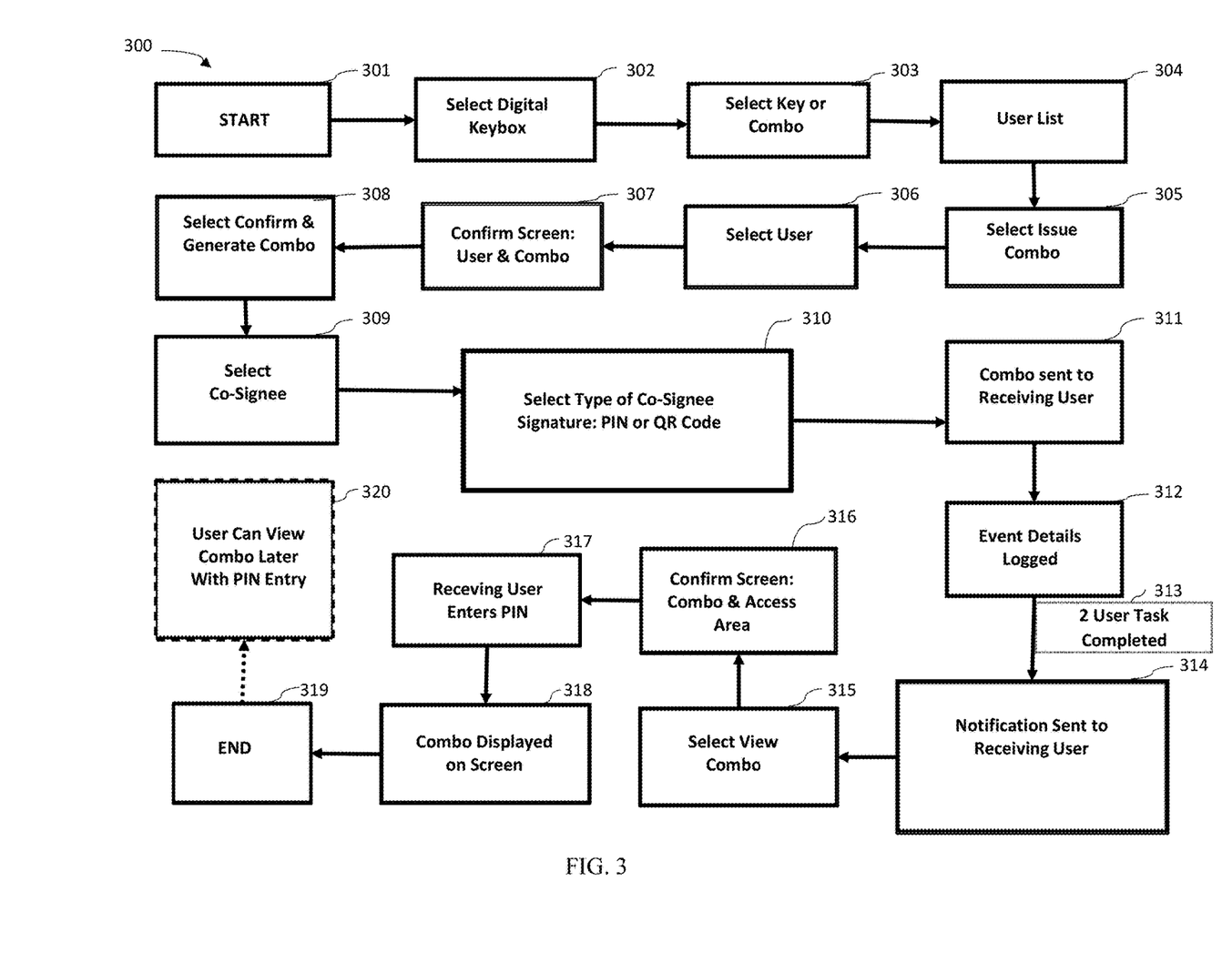
FIG. 3 is a Digital Log Event Flow Chart for a Digital Keybox.

FIG. 3 is a flow chart diagram 300 showing access of the Digital Keybox for issuance of a combination (Combo) and secure logging of the event. To start 301, the requesting user logs into the secure access digital log system of the present invention on a mobile device application or on a webpage. The app is opened and in the next step 302 the requesting user selects a log event; here the log event selected is the Digital Keybox. At step 303, Select Key or Combo, the requesting user will select issuance of a key or issuance of a combination and in this example the requesting user selected combination. In step 304, a user list screen shows a list of employees that have authorization to receive an issued Key or Combo, and in this example, the requesting user selected Issue Combo. In the next step 306, at the select user screen, the requesting user will select a receiving employee from the list to receive the issued Combo.

At the confirmation step 307, the log event details are shown with the receiving employee's name, access area, date, time, and the administrator, along with a button to confirm the details. In the next step 308, the requesting user will tap the Confirm and Generate Combo button to confirm the details and generate the Combo or security send a previously saved combo from the system database. At step 309, Select Co-signee, the requesting user will select a co-signee from a list of employees. At Step 310, the Co-signee selects a signature type, such as scanning a QR code or entering a PIN. After the co-signee signs, in step 310 the Combo is sent to the receiving user electronically. Next, step 312 the Event details are logged in the digital event log. After step 312, the requesting user and the co-signee issuing the Combo are finished 313 and the two-user authentication is completed. In step 315, notification of the issued combination is sent to the receiving user. For step 315, the receiving user selects View Combo and the confirmation screen of step 316 will list the areas the issued combination will access. For the next step 317, the receiving employee enters their PIN, and in the next step 318, the Combo is displayed on screen of the receiving employee's mobile device. At step 319, once the receiving employee has viewed the Combo, the Issue Combo event log ends. The receiving user can also view the issued Combo 320 again at a later time with entry of the receiving user's PIN.

FIGS. 4A-4I show screens that users encounter for a Digital Keybox log event for issuance of a combination to a receiving employee. These figures show screens on a mobile device; however, if the program is accessed via a webpage on a computer, the user will encounter similar screens requiring the same data input to authenticate transactions. The requesting user logs into the secure access digital log system of the present invention on a mobile device and signs in using their name or email, and a password to access the secure log function. Issuance of a digital key or combination, or access to a secure area, requires input by a requesting user and input by a co-signee to issue the key or combination to a receiving employee or user.

Figure 4A:
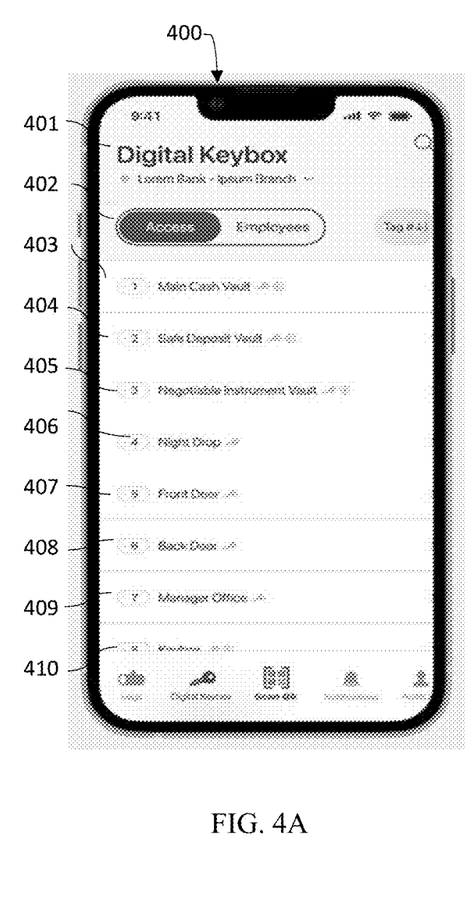
FIGS. 4A-4I are a series of screen shots showing Digital Keybox Events.

To issue a combination to the Main Cash Vault to another employee, after signing in, the requesting user selects Keybox. In FIG. 4A, the Digital Keybox screen 400 identifies that this is Digital Keybox pertaining to a specific facility 401. A toggle button 402 allows the user to switch between Access and Employees. If the button is toggled to Employees, a selectable list of employees will open on the screen. If Access is selected, a list of access areas shows on the screen. Examples of Access areas shown here are Main Cash Vault 403, Safe Deposit Vault 404, Negotiable Instrument Vault 405, Night Drop 406, Front Door 407, Back Door 409 and Keybox 410. Icons beside the access areas indicate if keys or combinations are required. From the list, Main Cash Vault 403 is selected here.

Figure 4B:
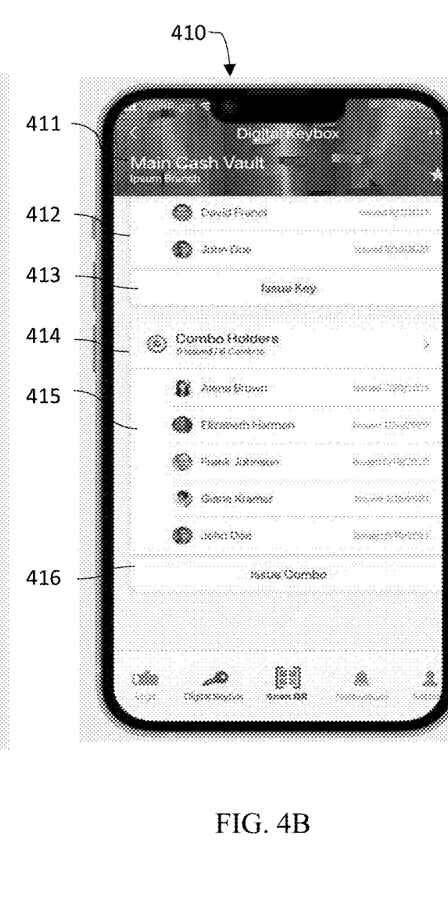

FIG. 4B is the Digital Keybox screen 410 and indicates this Keybox is for the Main Cash Vault at a specified facility 411. A list of users 412 authorized to issue keys is presented with an Issue Key button 413. A list of users 414 authorized to issue combinations is also presented with an Issue Combo button 416. The Issue Combo button 416 is selected and a new log entry screen opens.

Figure 4C:
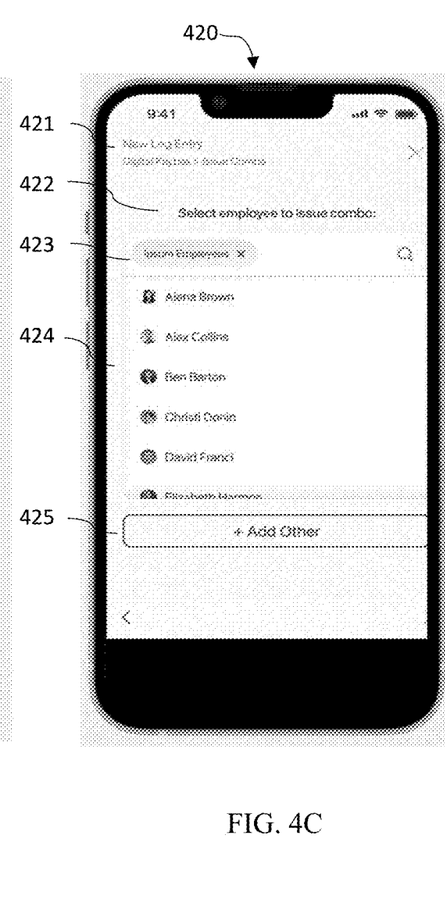

As seen in FIG. 4C, the New Log Entry screen 420 identifies the New Log Entry is for the Digital Keybox to Issue a Combo 421. The screen indicates selecting an employee to issue the Combo to 422 and identifies the facility 423 associated with the listed employees. A list of employees 424 who may receive a combination is shown along with an Add Other button 425. If the employee to receive the combination is not on the list, the requesting user can use this button to enter a new name.

Figure 4D:
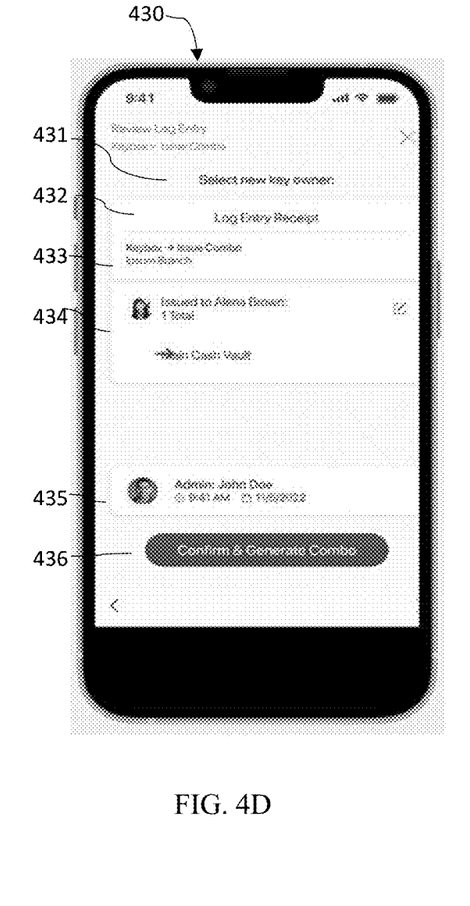

After a receiving employee is selected from the list, the Review Log Entry screen 430 shown in FIG. 4D shows Select New Key Owner 431 and the Log Entry Receipt 432. The Log Entry Receipt 432 identifies the transaction is for Keybox-Issue Combo 433 at the specified facility. The receiving employee's name and access area 434 are shown along the Admin details 435 including name, date, and time for the logged event. If the details of the event are correct, the requesting user will tap the Confirm and Generate Combo button 436. A co-signee is required for issuance of a Combo and a Co-signee is selected from a list of authorized employees. Options for how the co-signee will sign are displayed and a signing type is selected (as also shown in FIG. 2D).

Figure 4E:
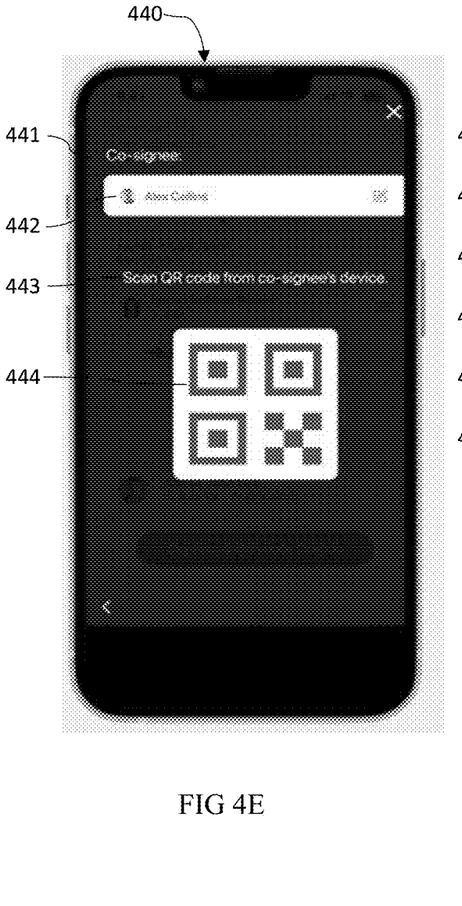

In this example, the Co-signee selected scanning a QR code, and as seen in FIG. 4E, the Co-signee pop-up 441 shows on screen 440 and displays the Co-signee's name 442, the instructions to Scan the QR code 443 from the Co-signee's device, and the QR code 444 for the co-signee to scan. If the QR code is selected, the present invention will generate a one-time use QR code that the co-signee employee will scan with their mobile device. The co-signee employee must be signed into the present invention to automatically sign. Having the QR code display on the requesting user's device and the QR code scanned using the Co-signee's device is a safeguard to verify that the requester and the co-signee are both present at the secure access transaction.

Figure 4F:
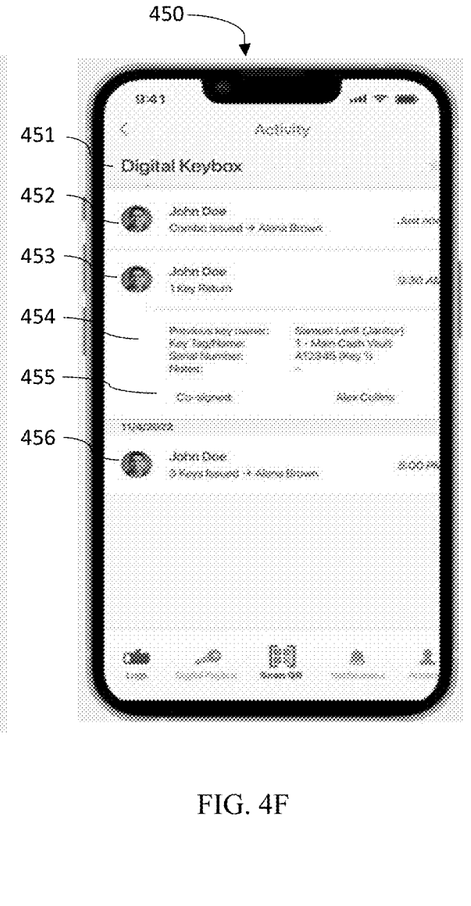

When the QR code is scanned and accepted, Activity screen 450 in FIG. 4F display shows that the entirety of the activity has been logged. The two employees (requesting user and co-signee) who issued the combination to the receiving employee are now finished with their part in the secure access process. The Activity screen 450 displays that the activity is for the Digital Keybox 451 and displays the Combo issued details 452 including names of the requesting employee and the receiving employee, as well as the time of the logged event, shown here as "just now" with the mobile device indicating the current time as 9:41. The Activity log also details previous events, such as a key return 453 and keys issued 456 seen in the Activity screen 450.

Figure 4G:
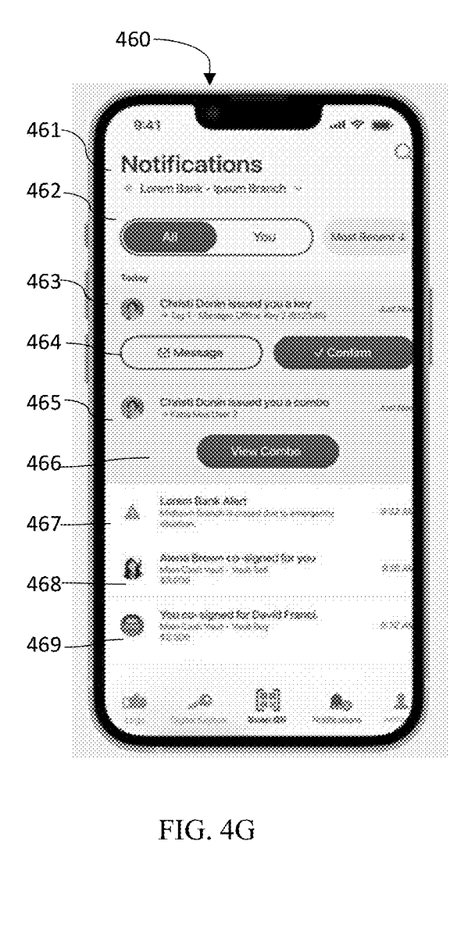

FIG. 4G shows a notification screen 460 for the receiving employee displaying the Notifications 461 for a specific facility. The screen has a toggle button 462 where the user can switch between all notifications and notifications for them; the toggle here is set for all. The receiving employee has received notification of a key issued 463 along with the issue details and with confirm or message buttons 464 to either confirm receipt of the key or to message the person issuing the key. The receiving employee also has a notification of the combo issued 465 with a View Combo button 466. Other notifications will also be displayed on this screen, with example notifications here being an alert at another bank 467, notification that another employee has co-signed for this user 468, and a notification that this user has co-signed for another employee. These notifications keep employees informed of the secure access instruments issued to them and also details of the secure access processes in which they have participated.

Figure 4H:
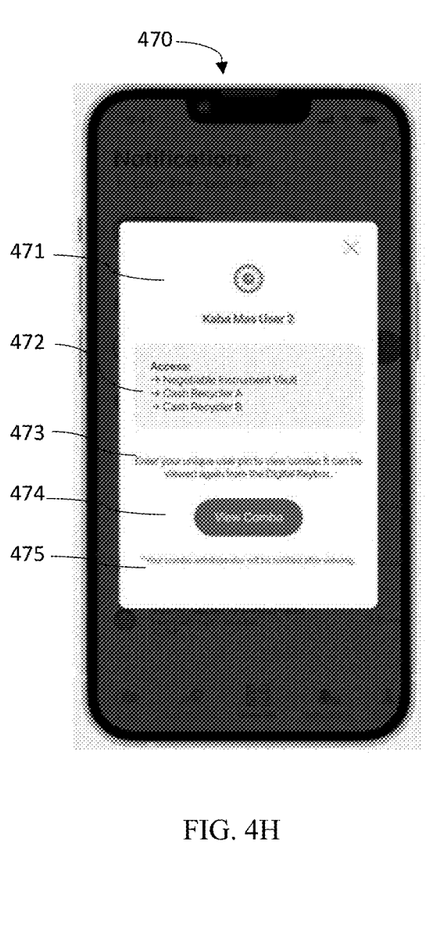

When the View Combo button 466 on the notifications screen 460 is tapped, a combination pop-up 471 shows on the receiving employee's screen 470 as seen in FIG. 4H. The combination pop-up 471 displays the areas where access has been granted. The receiving employee is instructed to enter their PIN to view the combo and is also informed that the combination can be accessed again from the Digital Keybox. The receiving employee is also informed that the administrator will be informed when the combination is viewed 475. Tapping the View Combo button 474 will take the receiving employee to a screen to enter their PIN and after the PIN is entered, the combination will be displayed on the screen.

The acceptance of the Combo by the receiving employee is recorded and logged to the database. Once the combo is issued, employees can return to the Digital Keybox section of present invention and will see that they are now listed as a combo holder. Employees can click on "view combo" to view the combo at any time. They must enter their PIN to confirm their identity and the viewing event is recorded and logged to the database.

Figure 4I:
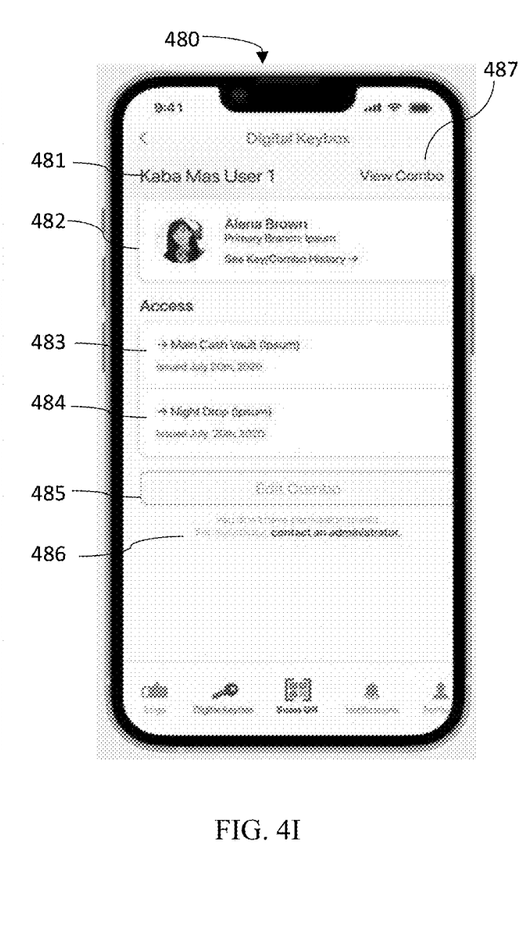

FIG. 4I, shows a Digital Keybox screen 480 for a user 481 with an option to View Combo 487 at the top. The user is identified 482 with a key/combo history available. The Access section displays areas the user can access and when access has been granted for the user. In this example, the display shows access to the Main Cash Vault 483 and the Night Drop 484 have been granted to the user. An Edit Combo button 485 is accessible to authorized employees. Employees who are not authorized will see notice that they do not have permission to edit 486 and to contact an administrator for assistance.

As shown in FIGS. 1, 2A-2E, 3, and 4A-4I, digital logs are used as the institution's primary risk control management of assets. The system for digital event logging for secure area access and secure distribution of keys, codes and combinations as disclosed herein provides a trackable validated solution to the numerous problems associated with the previously used paper logs which are used to manually record access to secure areas and distribution of keys. The present invention enhances security of access and distribution of electronic keys and combinations. When secure access transactions are logged by the present invention, there is a verified record of the event details.

The disclosed digital key box tracks key and combination inventory and issuance history. The digital key box electronically stores and issues all combinations. The disclosed digital key box provides improved inventory management for each asset and employee, so information is instantly and centrally accessible. Encrypted combinations are digitally stored and securely issued.

With digital keys and a digital key box, employees can also access combinations in sole control instead of requiring dual control. The disclosed digital key box eliminates the need for employees to access the key box in dual control when they need to access a granted combination, and they no longer have to reseal paper combinations in an envelope to place back in paper log-based dual control situation.

Sometimes activities such as accessing vaults, auditing vaults, etc., are required to be done simultaneously by two people in 'dual control" for verification. The disclosed system "proves" dual control was in place by generating a unique QR code on Person A's device that must then be scanned by Person B's device. Both parties, A and B, must be logged into the present invention application with their unique credentials; thus, proving Person A was in proximity to Person B when the event/activity was logged. All of the dual control verification event details are logged in the present invention system.

Access codes are encrypted and stored on a central database which leverages Column-level encryption. Users of the system will input data to digitally catalog and document the access to vaults and other secure areas, after the completion of certain high-risk processes, and delivery of keys, codes and combinations electronically through the use of remote mobile units controlled by authorized personnel and a centralized system of the present invention, with authentication and verification of the mobile users and digital logging of the event details. Fraud alerts may be issued if inaccurate or abnormal information is provided when a mobile user is queried to provide authentication and verification information or if inaccurate or improper access codes, combinations, or keys are input by a mobile user when queried for input.

The vaults and lockboxes may possess physical keys that provide access to certain doors, cabinets, or drawers at the bank location or numeric keys or codes that are assigned to one or more personnel working at the bank location. The vault and lockboxes may alternatively possess cashiers' checks, other financial instruments or checks that need to be secured at the bank location. Additionally, the system may securely assign and store a code or combination that could be assigned or provided to appropriate personnel.

Once a physical key, numeric key, or other combination or code is provided to a particular person, the person provided with the particular key or code will be documented and cataloged by the system in a verified and cryptographically secure manner so that information is accurate, verified, not corruptible, and not accessible to third parties. The verified information is an "automated paper trail" of who (person) is provided with what (key, code, or combination) when (time/date stamps) as documented in a secure and verified manner.

In the Admin Panel, users have access to a workflow builder that allows them the ability to instantly (with no coding) replicate any current paper log or make changes to existing logs by adding and/or removing screens or input fields, changing the order of log requirements, requiring or not requiring dual person authentication, and/or adding or removing child/dependency steps.

As shown in FIGS. 1, 2A-2E, 3, and 4A-4I, the present invention uses unique user credentials to validate and log secure access events, and provides for tracking, validating, and recording of access granted to secure areas and distribution of secure access instruments. The present invention supports the use of unique user credentials, code matching (e.g. QR matching), and indisputable day/date stamps. When security or secure access transactions are logged by the present invention, there is a verified record of the event details, which provides an easily accessible chronology or listing of record events.

The secure access system of the present invention disclosed herein tracks details pertaining to issuance of keys, combinations, and codes to employees with all of the event details logged in the system and stored in a secure database. For these recorded events, some details are automatically captured and logged, such as date, time and any information selected as an option presented on-screen, such as an employee or log name.

Some details are logged in the system upon user input of data, such as signatures, identification credentials, and additional notes specific to the transaction, such as a customer name or a cash amount. The system for digital event logging for secure area access and distribution of keys and combinations as disclosed herein provides a trackable and validated solution to the numerous problems associated with the previously logs or listings.

Figure 5:
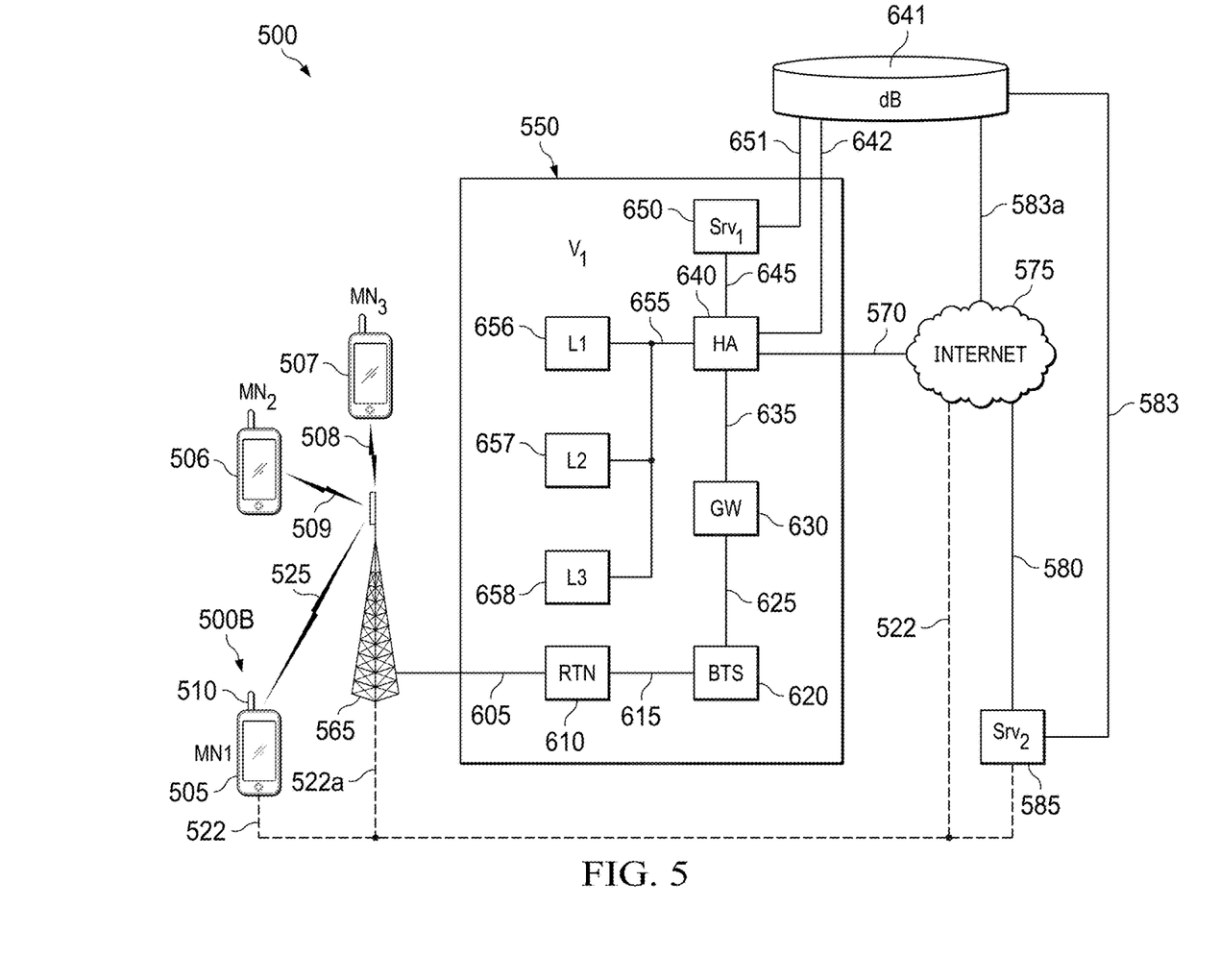
FIG. 5 is a system architecture diagram.

The communication system using the present invention is shown by block diagrams in FIG. 5, which is a communication system supporting the processing of communications between a home network 550 and one or more mobile units 507, 506 and 505, where the home network has a home agent 640 is coupled to a first computer server Srv1 650 by connection 645. The home network 550 processes communications to be transmitted and received from one or more mobile units 507, 506 and 505, and a transceiver unit 565 is coupled to the home network 550 by connection 605 for receiving and transmitting communications to the mobile units 507, 506 and 505.

With reference to FIG. 5, the communication system 500 of the present invention is shown with a detailed explanation of the system components available at the home network 550 as coupled via communication line 605 to the mobile radio transceiver/cellular/WIFI systems 565 as coupled to mobile nodes 505, 506 and 507. The mobile nodes 505, 506 and 507, include hand-held mobile units that include a processor, memory and a power source, as well as a transceiver and antenna 510. While a mobile unit is contemplated, laptops, fixed location computers, or computer pads can also be used instead and freely substituted with the mobile units 505, 506 and 507.

The transceiver and antenna 510 support radio transmission communications link 525 to a radio transceiver antenna and transmission network 565 (e.g. Wi-Fi, cellular, GSM, Evdo, 4G/LTE, CDMA, or others), which is coupled via connection 605 to a radio transmission network communication gateway 610 associated with the home network 550. The mobile hand-held units 505, 506 and 507 may also be connected to an outside server computer SRV2 585 via a separate connection 522, which can include a wireless radio connection or a wireline communication system connection. The mobile hand-held units 505, 506 and 507 may also be connected to the Internet 575 via the communication link 580 through outside server computer SRV2 585 or via a separate direct connection 522, which can include a wireless radio connection or a wireline communication system connection.

The mobile hand-held units 505, 506 and 507 can also be coupled to the radio transceiver antenna 565 and a radio transmission network that is coupled to a telecommunications system that supports connectivity 522a to the Internet 575 or another system network without interfacing directly with equipment or components in the home network 550.

The radio transmission network 610 is coupled to a base station transceiver unit 620 via connection 615, where the base station transceiver station provides an interface between radio domain communications and data communications carried over a telecommunications or network computer system. The base station transceiver unit 620 is coupled to a gateway 630 for the network at the home network 550 via connection 625, which provides an interface with the network maintained at the home network 550 or associated with the home network 550. The BTS 620 may also be located remotely from the home network near the remote radio transmission network 565 accessed by the mobile units 505, 506 and 507.

The radio transmission network 610 is coupled to a base station transceiver unit 620 via connection 615, where the base station transceiver station provides an interface between radio domain communications and data communications carried over a telecommunications or network computer system. The base station transceiver unit 620 is coupled to a gateway 630 for the network at the home network 550 via connection 625, which provides an interface with the network maintained at the home network 550 or associated with the home network 550. The BTS 620 may also be located remotely from the home network near the remote radio transmission network 565 accessed by the mobile units 505, 506 and 507.

The home agent 640 is coupled to the Internet 575 via a connection 570, and the Internet 575 may be coupled to one or more servers SRV2 585 via connection 580. The mobile hand-held units 505, 506 and 507 may also be connected to SRV2 585 via a separate connection 522, which can include a wireless radio connection or a wireline communication system connection. A database 641 is coupled to the home agent 640 via communication link 642 or computer server 650 via link 651 or computer server SrV2 585 directly via link 583 or indirectly through the Internet 575 via communication links 583a and 580. The database 641 may maintain information related to the users, employees, or institutions, but it could also maintain remote access to software modules and database information used with the software operated by the present invention as well as database information related the business operations. While only one database 641 is shown, this representation is understood to include one or more separate databases and storage locations of data and information.

The file data storage database 641 in FIG. 5 stores data in a standardized format for customer service information, and that format in the present invention enhances the performance and increases the efficiency of the present invention over known data processor and storage systems through the storage of standardized formatted secure access information from user input event details, and logged event information in the hardware processor-based system and the use of an indexing and referential storage and specialized subprograms that uses hardware processor-based storage devices to collect and consolidate customer service information, files and service information provided by different sources and different formats.

The database 641 in the present system enhances the performance and increases the efficiency of the present data processor and storage system network over known data processor and storage systems by the use of an indexing and referential storage. The database 641 is used with the specialized subprograms to generate/transmit notifications, as well as generate/transmit and receive secure access notifications and messages. The present invention stores data in the database 641 in a more efficient and effective manner than previously used in other data storage systems through the use of an enhanced performance data storage sub-system using a self-referential, indexed data storage protocol and procedure that store all entity types in a single table after indexing is performed to prevent the creation of duplicative data entries in the data storage sub-system. The indexing protocols and procedures used in the enhanced data storage sub-system of the present invention reviews input data (received in health level 7 or HL7 format), The home network 550 processes communications to and from the mobile units, and information related to the mobile nodes location and proximity can be used to include selected communications that possess information and data relating to specific transactions between users for requesting, granting, confirming, and receiving secure access instruments and logging all of the secure access events. Additionally, the system may use GPS or geofencing to prove the employee was onsite at the physical location. FIG. 5 is a system architecture diagram supporting processing of the secure access communications of the present invention. The home network can communicate via wireless transmission or a wired communication link to the mobile node, the Internet, other computer servers or other foreign or associated home networks.

The home network embodiment shown in FIG. 5 supports a Wi-Fi connection (or similar mobile network connection) that allows the pushing of data onto the hand-held mobile device. The invention can use the device's Wi-Fi or cellular connection to activate notification messages users based on the mobile unit's geographic location or proximity location.

The network shown in FIG. 5 supports the entry of customer logging of secure access events into the system, including events related to requesting, confirming, and granting of secure access instruments, such as keys and combinations, as well as the receiving of secure access instruments. Users of the system are identified by personal signatures including entry of PINs, scanning of QR codes or written signatures, all of which are confirmed by the system, and then all details of the transactions are logged as secure events including the identification of all of the parties in the transaction process.

Notification of granted secure access instruments are sent to receiving users as well as to administrative personnel. The real-time notifications to receiving users allow for access to keys and combinations to be delivered quickly and securely to the user and provides immediate logging of the secure events. The present invention's use of an enhanced performance data storage sub-system using a self-referential, indexed data storage protocol and procedure supports record storage in a table after indexing, which also allows for faster searching of data stored therein compared to other data storage systems.

Moreover, the enhanced performance data storage sub-system using a self-referential, indexed data storage protocol and procedure in the present invention allows for more effective storage of data than other data storage systems, such as image and unstructured data storage. And, the enhanced performance data storage sub-system using a self-referential, indexed data storage protocol and procedure in the present invention provides for more flexibility in the configuration of the data and records stored therein over other data storage systems.

The home agent is also coupled via connection 655 to various locations L1 656, L2 657, and L3 658 at home network 550 so that operations software, data, secure access events, notifications or other information can be entered, transmitted, or received on the system and controlled by users at the business location. Users and controllers at the home network location may also access the home network 550 remotely via communication links and wireless communication links or mobile units.

The mobile units 505, 506, and 507 represent mobile units used by the customer to prepare and enter the customer feed-back evaluation information. Communications to the system, customer evaluation, requests for information, or notifications can be received by the customer from remote access locations or the home network using the hand-held mobile units 505, 506, and 507 as connected to the home network 550.

The computer server SrV1 650 on the home network 550 also supports the maintenance and use of data, customer information, software modules and operational code for the present invention, as well as maintaining the webpages that support the applications program download for the present invention and supporting the interaction of communications with the mobile units 505, 506, and 507, and database 641.

The Internet 575 can also maintain server computers, cloud storage, or server for maintaining database information, code, software modules, or the webpages that support the applications program download for the present invention, as well as supporting the interaction of communications with the mobile units 505, 506, and 507 or database 641. Furthermore, home network 550 or the computer server SRV2 585 can facilitate or assist with the maintenance of database information, code, software modules, or the webpages that support the applications program download for the present invention, as well as supporting the interaction of communications with the mobile unit 505 or database 641.

The foregoing description of embodiments of the invention has been presented only for the purpose of illustration and description and is not intended to be exhaustive or to limit the invention to the precise forms disclosed. The present invention correlates and associates various types of secure access events that are requested, confirmed, granted and logged and to provide integrated notifications and notices, as well as integrated data sharing, users, employees, administrative personnel, and other authorized persons. While the preferred embodiment herein describes a banking institution, the present invention could be used in any other facility that requires secured access to one or more areas and which requires secure event details to be positively confirmed and logged. Numerous modifications and adaptations thereof will be apparent to those skilled in the art without departing from the spirit and scope of the present invention.

The invention claimed is:

1. A communication system supporting security access communications with one or more mobile units comprising:
a home network associated with a first facility location and having a home agent coupled to a computer server, said home agent and said computer server processing communications received from said one or more mobile units, said computer server and said home agent coupled to a database memory that maintains log records for the communication system; said home agent and said computer server coupled to a transceiver unit and the Internet for receiving and transmitting communications with one or more said mobile units;
a first processing unit associated with the computer server on the home network, said first processing unit being coupled to said home agent and said first processing unit analyzing communications received from said one or more mobile units,
said first processing unit, in response to a communication request received from said one or more mobile units, transmits a security code to one or more mobile units, said security code being generated by the first processing unit using a cryptographic code generation subroutine and said security code being stored on said log record maintained on said database memory; said log record maintained on said database memory recording the date/time and location of use of the security code being stored;

said first processing unit stores in said database memory, in response to one or more personnel being granted access to one of more secure areas at the first facility location, a record of the personnel being granted access, the secure area being granted access, and the date/time access was granted;

said home network opening physical access to one or more secure areas at the first facility location based on a communication received from one or more mobile units, said communication validating the entry of an acceptable verification code into said one or more mobile units;

the first processor unit stores a record, in response to physical access being opened to one or more secure areas, said record includes an identification the personnel that opened physical access to said one or more secure areas, a listing of any item removed from the one or more secure areas; the identification of any person that was provided with any item removed item from said one or more secure areas; and, the date/time and location when said personnel opened physical access to one or more secure areas;

said home network, in response to detecting that physical access has been opened to one or more secure areas at the first facility location, transmits a communication to one or more predetermined personnel to inform those predetermined personnel that access was provided to one or more secure areas; and, said first processing unit is programmed with business rules and parameters, and said first processing unit, in response to detecting a violation of one or more of said business rules and parameters, transmits a communication to one or more predetermined personnel to inform those predetermined personnel of the violation of said one or more business rules and parameters.

2. A communication system according to claim 1 wherein said security code transmitted by said first processing unit includes a combination associated with one or more secured areas.

3. A communication system according to claim 1 wherein said acceptable verification code entered into said one or more mobile units includes a dual verification code.

4. A communication system according to claim 1 wherein said first processing unit stores in said database memory, in response to one or more personnel being removed access to one of more secure areas at the first facility location, a record of the personnel being removed access, the secure area being denied access, and the date/time access was removed.

5. A communication system according to claim 1 wherein said one or more secure areas includes a key-box, vault, or lock boxes.

6. A communication system according to claim 1 wherein said code transmitted to said mobile unit includes a security key, a cabinet/drawer key, or a front door key.

7. A communication system according to claim 1 wherein said item removed from one or more secure areas includes a security key, electronic combination or code.

8. A communication system according to claim 1 wherein said item removed from one or more secure areas includes a cabinet/drawer key or a front door key.

9. A communication system supporting security access communications with one or more mobile units comprising:

a home network associated with a first facility location and having a home agent coupled to a computer server, said home agent and said computer server processing communications received from said one or more mobile units, said computer server and said home agent coupled to a database memory that maintains log records for the communication system; said home agent and said computer server coupled to a transceiver unit and the Internet for receiving and transmitting communications with one or more said mobile units;

a first processing unit associated with the computer server on the home network, said first processing unit being coupled to said home agent and said first processing unit analyzing communications received from said one or more mobile units, said first processing unit, in response to a communication request received from said one or more mobile units, transmits a security code to one or more mobile units, said security code being generated by the first processing unit using a cryptographic code generation subroutine and said security code being stored on said log record maintained on said database memory; said log record maintained on said database memory recording the date/time and location of use of the security code being stored;

said first processing unit stores in said database memory, in response to one or more personnel being granted access to one of more secure areas at the first facility location, a record of the personnel being granted access, the secure area being granted access, and the date/time access was granted;

said home network opening physical access to one or more secure areas at the first facility location based on a communication received from one or more mobile units, said communication validating the entry of an acceptable verification code into said one or more mobile units;

said home network, in response to detecting that physical access has been opened to one or more secure areas at the first facility location, transmits a communication to one or more predetermined personnel to inform those predetermined personnel that access was provided to one or more secure areas; and, said first processing unit, in response to an alert received from one or more secure areas at the first facility location are being accessed, stores on said database memory a record of the date/time, location and personnel accessing said one or more secure areas.

10. A communication system according to claim 9 wherein said security code transmitted by said first processing unit includes a combination associated with one or more secured areas.

11. A communication system according to claim 9 wherein said acceptable verification code entered into said one or more mobile units includes a dual verification code.

12. A communication system according to claim 9 wherein said first processing unit stores in said database memory, in response to one or more personnel being removed access to one of more secure areas at the first facility location, a record of the personnel being removed access, the secure area being denied access, and the date/time access was removed.

13. A communication system according to claim 9 wherein said one or more secure areas includes a key-box, vault, or lock boxes.

14. A communication system according to claim 9 wherein said code transmitted to said mobile unit includes a security key, a cabinet/drawer key, or a front door key.

15. A communication system according to claim 9 wherein the first processor unit stores a record, in response to physical access being opened to one or more secure areas, said record includes an identification the personnel that opened physical access to said one or more secure areas, a listing of any item removed from the one or more secure areas; the identification of any person that was provided with any item removed item from said one or more secure areas; and, the date/time and location when said personnel opened physical access to one or more secure areas.

16. A communication system according to claim 9 wherein said first processing unit is programmed with business rules and parameters, and said first processing unit, in response to detecting a violation of one or more of said business rules and parameters, transmits a communication to one or more predetermined personnel to inform those predetermined personnel of the violation of said one or more business rules and parameters.

17. A communication system supporting security access communications with one or more mobile units comprising:
- a home network associated with a first facility location and having a home agent coupled to a computer server, said home agent and said computer server processing communications received from said one or more mobile units, said computer server and said home agent coupled to a database memory that maintains log records for the communication system; said home agent and said computer server coupled to a transceiver unit and the Internet for receiving and transmitting communications with one or more said mobile units;
- a first processing unit associated with the computer server on the home network, said first processing unit being coupled to said home agent and said first processing unit analyzing communications received from said one or more mobile units,
- said first processing unit, in response to a communication request received from said one or more mobile units, transmits a security code to one or more mobile units, said security code being generated by the first processing unit using a cryptographic code generation subroutine and said security code being stored on said log record maintained on said database memory; said log record maintained on said database memory recording the date/time and location of use of the security code being stored;
- said home network opening physical access to one or more secure areas at the first facility location based on a communication received from one or more mobile units, said communication validating the entry of an acceptable verification code into said one or more mobile units;
- said first processing unit stores in said database memory, in response to one or more personnel being granted access to one of more secure areas at the first facility location, a record of the personnel being granted access, the secure area being granted access, and the date/time access was granted;
- said first processing unit, in response to an alert received from one or more secure areas at the first facility location are being accessed, stores on said database memory a record of the date/time, location and personnel accessing said one or more secure areas;
- the first processor unit stores a record, in response to physical access being opened to one or more secure areas, said record includes an identification the personnel that opened physical access to said one or more secure areas, a listing of any item removed from the one or more secure areas; the identification of any person that was provided with any item removed item from said one or more secure areas; and, the date/time and location when said personnel opened physical access to one or more secure areas; and,
- said home network, in response to detecting that physical access has been opened to one or more secure areas at the first facility location, transmits a communication to one or more predetermined personnel to inform those predetermined personnel that access was provided to one or more secure areas.

18. A communication system according to claim 17 wherein said first processing unit is programmed with business rules and parameters, and said first processing unit, in response to detecting a violation of one or more of said business rules and parameters, transmits a communication to one or more predetermined personnel to inform those predetermined personnel of the violation of said one or more business rules and parameters.

19. A communication system according to claim 17 wherein one or more secure areas are locked using a smart/IoT lock.

20. A communication system according to claim 17 further comprising an RFID tag that is used to detect if physical access to one or more secure areas is already opened.

* * * * *

UNITED STATES PATENT AND TRADEMARK OFFICE
CERTIFICATE OF CORRECTION

PATENT NO. : 12,327,451 B2
APPLICATION NO. : 18/231109
DATED : June 10, 2025
INVENTOR(S) : Hilaire et al.

Page 1 of 1

It is certified that error appears in the above-identified patent and that said Letters Patent is hereby corrected as shown below:

In the Claims

Column 17, Claim 1, Line 6, after "one" delete "of" and insert --or--
Column 17, Claim 1, Line 18, after "identification" insert --of--
Column 17, Claim 1, Line 22, after "removed" delete "item"
Column 17, Claim 4, Line 49, after "one" delete "of" and insert --or--
Column 18, Claim 9, Line 27, after "one" delete "of" and insert --or--
Column 18, Claim 9, Line 46, after "location" insert --that--
Column 19, Claim 15, Line 8, after "removed" delete "item"
Column 20, Claim 17, Line 7, after "one" delete "of" and insert --or--
Column 20, Claim 17, Line 13, after "location" insert --that--
Column 20, Claim 17, Line 18, after "identification" insert --of--
Column 20, Claim 17, Line 23, after "removed" delete "item"

Signed and Sealed this
Nineteenth Day of August, 2025

Coke Morgan Stewart
*Acting Director of the United States Patent and Trademark Office*